United States Patent [19]
Derrien

[11] Patent Number: 5,269,481
[45] Date of Patent: Dec. 14, 1993

[54] RAISABLE LANDING GEAR FITTED WITH A HINGED SIDE-BRACE HAVING TWO ALIGNMENTS

[75] Inventor: Michel Derrien, Versailles, France

[73] Assignee: Messier-Bugatti, Velizy Villacoublay, France

[21] Appl. No.: 11,789

[22] Filed: Feb. 1, 1993

[30] Foreign Application Priority Data

Feb. 3, 1992 [FR] France ................. 92 01161

[51] Int. Cl.[5] .................. B64C 25/10; B64C 25/12
[52] U.S. Cl. ............. 244/102 R; 244/102 A; 244/102 SL
[58] Field of Search ......... 244/102 R, 102 A, 102 SS, 244/102 SL, 104 R

[56] References Cited

U.S. PATENT DOCUMENTS

| | | | |
|---|---|---|---|
| 2,082,598 | 6/1937 | Saulnier | 244/102 R |
| 3,533,580 | 10/1970 | Lucien | 244/102 R |
| 4,586,682 | 5/1986 | Veaux et al. | 244/102 R |
| 5,022,609 | 6/1991 | Cranston | 244/102 R |
| 5,039,033 | 8/1991 | Woerner et al. | 244/102 R |

FOREIGN PATENT DOCUMENTS

| | | | |
|---|---|---|---|
| 0031602 | 7/1981 | European Pat. Off. | 244/102 SL |
| 704202 | 3/1941 | Fed. Rep. of Germany . | |
| 2503086 | 10/1982 | France | 244/102 R |
| 806024 | 5/1956 | United Kingdom . | |

Primary Examiner—Michael S. Huppert
Assistant Examiner—Virna Lissi Ansley
Attorney, Agent, or Firm—Sixbey, Friedman, Leedom & Ferguson

[57] ABSTRACT

The invention relates to raisable landing gear including a shock absorber having a strut and a sliding rod, together with a two-alignment hinged side-brace. According to the invention, unlocking means are provided to break the secondary alignment, thereby breaking the main alignment while the landing gear is being raised, said means being essentially constituted by a lever mounted to rotate on one of the arms of the main alignment, and by a motor and gear box assembly for driving said rotary lever in rotation and further including an unlocking arm that, when said motor and gear box assembly is in action, co-operates with the lower arm of the secondary alignment to break said secondary alignment. Return means are also associated with the rotary lever to ensure that it returns to its initial position when the landing gear is raised.

7 Claims, 1 Drawing Sheet

RAISABLE LANDING GEAR FITTED WITH A HINGED SIDE-BRACE HAVING TWO ALIGNMENTS

The invention relates to aircraft landing gear, and more particularly to raisable landing gear fitted with a hinged side-brace having two alignments.

BACKGROUND OF THE INVENTION

Raisable landing gear is already known of the type that comprises a shock absorbing strut hinged to the structure of an airplane, and including a sliding rod that carries a wheel set, the landing gear also including a hinged side-brace with two alignments: a main alignment that connects the shock absorber strut to the airplane structure and comprising an upper arm hinged to a lower arm; and a secondary alignment connecting one of the arms of the main alignment to said airplane structure, and likewise comprising an upper arm hinged to a lower arm, unlocking means also being provided to break the secondary alignment and consequently to break the main alignment when the undercarriage is raised.

In order to make the organization of such landing gear easier to understand, together with the problems that can be encountered with the type of unlocking means used, FIG. 1 of the accompanying drawings shows a conventional raisable landing gear of the above-specified type, said landing gear being shown in the lowered position so as to enable its component parts to be distinguished more clearly, and in particular so as to show its hinged side-brace having two alignments (with the position of the landing gear in the raised position also being shown in order to complete the drawing).

From FIG. 1, it can be seen that raisable landing gear T has a shock absorber 100 constituted by a shock absorbing strut 101 and a rod 102 slidable coaxially within said strut. The top of the shock absorber strut 101 is hinged (at 103) to the structure S of the airplane, with the hinge axis passing through the end of a link branch 107 secured to said strut. A brace element 106 is associated with the shock absorber 100, said element being connected firstly via a rotary hinge 108 to the end of the link branch 107 and being hinged secondly at 109 on a bottom appendix of the shock absorber strut 101. The brace element 106 is also hinged at its bottom end 110 to a rotary sleeve 111 which is connected via a scissors linkage (having two arms 112 and 113) to the chassis 105 of a hinged wheel set 104 provided at the bottom end of the sliding rod 102. A driving actuator 115 serves to raise or lower the landing gear T, with the cylinder 116 of said actuator 115 being hinged on a middle appendix 114 of the brace element 106 while the rod of said actuator is hinged at its end 117 to the structure of the airplane. There can also be seen a wheel 118 disposed at the end of an appendix provided on the bottom portion of the strut, which wheel co-operates when the landing gear is raised with the hook of a catch box 119 housed inside the structure of the airplane.

The landing gear T is also fitted with a hinged side-brace 120 having two alignments. In the undercarriage-lowered position shown in FIG. 1, the component members of said hinged side-brace can be seen clearly, and in particular its main alignment 121 and its secondary alignment 131.

The main alignment 121 connects the shock absorber strut 101 (via a hinge 125 which is also associated with two connecting rods 126 and 127) and it comprises an upper arm 122 and a lower arm 123 which are hinged together at a hinge 124. As for the secondary alignment 131, it connects an arm (in this case the upper arm 122) of the main alignment 121 (via a hinge 135) to the structure of the airplane (at a hinge 136 associated with one end 128 of the above-mentioned fixed connecting rod 126), and it is also constituted by an upper arm 132 and a lower arm 133 which are hinged together at a hinge 134.

Unlocking means 140 are also provided to break the secondary alignment and thus to break the main alignment when the landing gear is raised. As shown herein, this unlocking means 140 is conventionally implemented in the form of a small actuator whose cylinder, in this case, is hinged at 141 to the upper arm 122 of the main alignment 121, while the rod thereof is hinged at 142 to the lower arm 133 of the secondary alignment 131.

When the driving actuator 115 is actuated to lower the landing gear, the small actuator 140 associated with the side-brace 120 follows the deployment motion of the two alignments 121 and 131, said motion generally being assisted by the presence of two traction springs 137 connecting the upper arm 132 of the secondary alignment 131 (at 138) to the airplane structure (at 139). In contrast, the landing gear is being raised, the small actuator 140 associated with the side-brace 120 is activated to retract its rod and thus break the secondary alignment 131 against the force of the return springs 137, thereby breaking the main alignment 121, and thus enabling the driving actuator 115 to operate normally.

Such a system is in widespread use, however it nevertheless suffers from a drawback inherent to the use of a small actuator as the unlocking means enabling the two alignments of the hinged side-brace to be broken. It is not possible to completely avoid the possibility that the locking means will become jammed, and the small actuator may seize up specifically when the instruction is given to raise the landing gear (said actuator merely following while the landing gear is being lowered).

OBJECT AND SUMMARY OF THE INVENTION

The invention seeks specifically to resolve this technical problem by designing a raisable landing gear of the above-specified type in which unlocking can be obtained in a manner that is more reliable than with the small actuator used in conventional landing gear.

An object of the invention is thus to provide a raisable landing gear whose structure makes it easy to achieve the unlocking function to break the two alignments of its side-brace, thereby enabling the landing gear to be raised normally and without any danger of opposition to subsequent lowering of said landing gear.

More particularly, the present invention provides a raisable landing gear comprising a shock absorbing strut hinged to the structure of an airplane, having a sliding rod that carries a set of wheels, and a two-alignment hinged side-brace with a main alignment that connects the shock absorbing strut to the structure of the airplane and constituted by an upper arm and a lower arm that are hinged together, and a secondary alignment connecting one of the arms of the main alignment to said structure of the airplane, said secondary alignment likewise being constituted by an upper arm and a lower arm that are hinged together, unlocking means also being provided to break the secondary alignment and consequently to break the main alignment when the landing gear is raised, wherein the unlocking means is essentially constituted by a lever mounted to rotate on that arm of the main alignment on which the secondary alignment is hinged, and by a motor and gear box assembly driving said rotary lever in rotation, said lever including an unlocking arm that, on actuation of said motor and a gear box assembly, co-operates with the lower arm of the secondary alignment to break said secondary alignment, return means also being associated with said rotary alignment to ensure that it returns to its initial position when the landing gear is raised.

Preferably, the rotary lever is mounted on the upper arm of the main alignment between the hinge connecting said arm to the lower arm of the secondary alignment and the hinge interconnecting the two arms of the main alignment, and having a return arm which co-operates with the return means associated with said rotary lever.

It is then advantageous for the return means associated with the rotary lever to include a traction spring connecting the return arm of said lever to a point on the upper arm of the main alignment. It is also advantageous for the return arm of the rotary lever to have an end wheel, and to be disposed in such a manner that the lower arm of the main alignment comes into contact with said end wheel while the landing gear is being raised, thereby guaranteeing that said rotary lever is returned to its initial position when the landing gear is raised.

In a particular embodiment, the rotary lever is in the form of a bell-crank, having an unlocking arm and a return arm which are of substantially the same length, thereby facilitating compactness of the unlocking means.

It is also advantageous for the motor and gear box assembly to be provided with a torque limiter disposed between the gear box of said assembly and the rotary lever. It is then preferable for the the torque limiter to be a friction torque limiter, and to be rated to a value that exceeds the force of the locking springs associated with the hinged side-brace.

BRIEF DESCRIPTION OF THE DRAWING

Other characteristics and advantages of the invention appear more clearly in the light of the following description and of the accompanying drawing which relates to a particular embodiment, and in which.

MORE DETAILED DESCRIPTION

Figure 1:
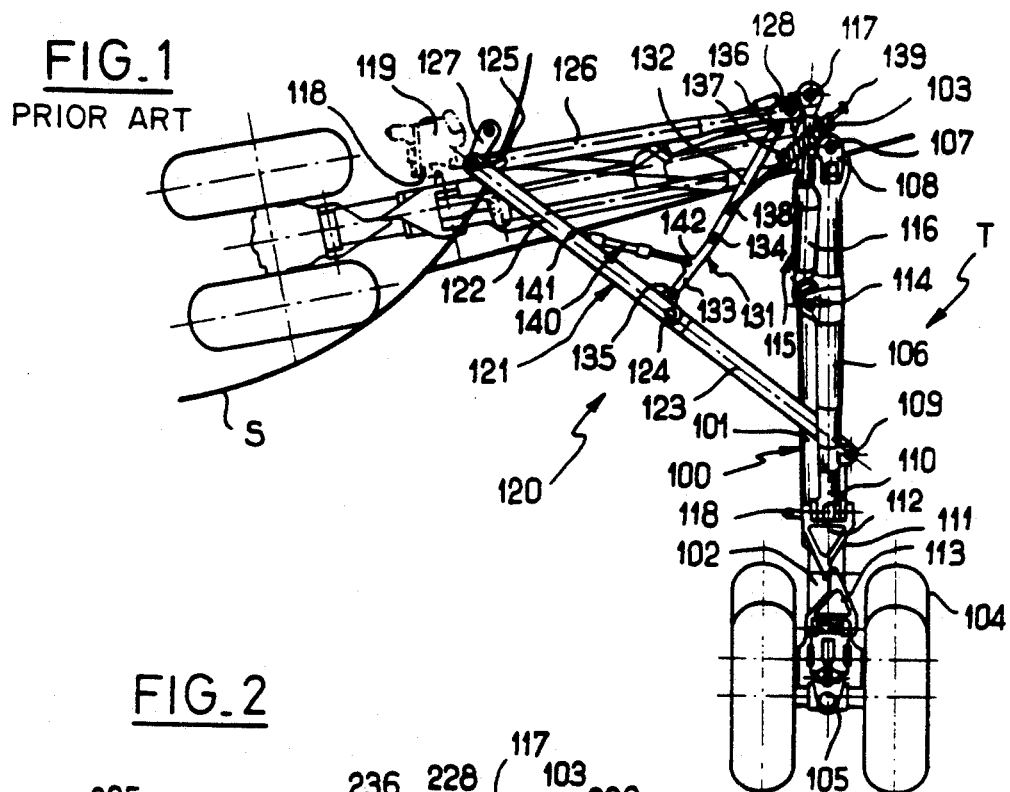
FIG. 1 shows a prior art landing gear in the landing gear lowered position.
Figure 2:
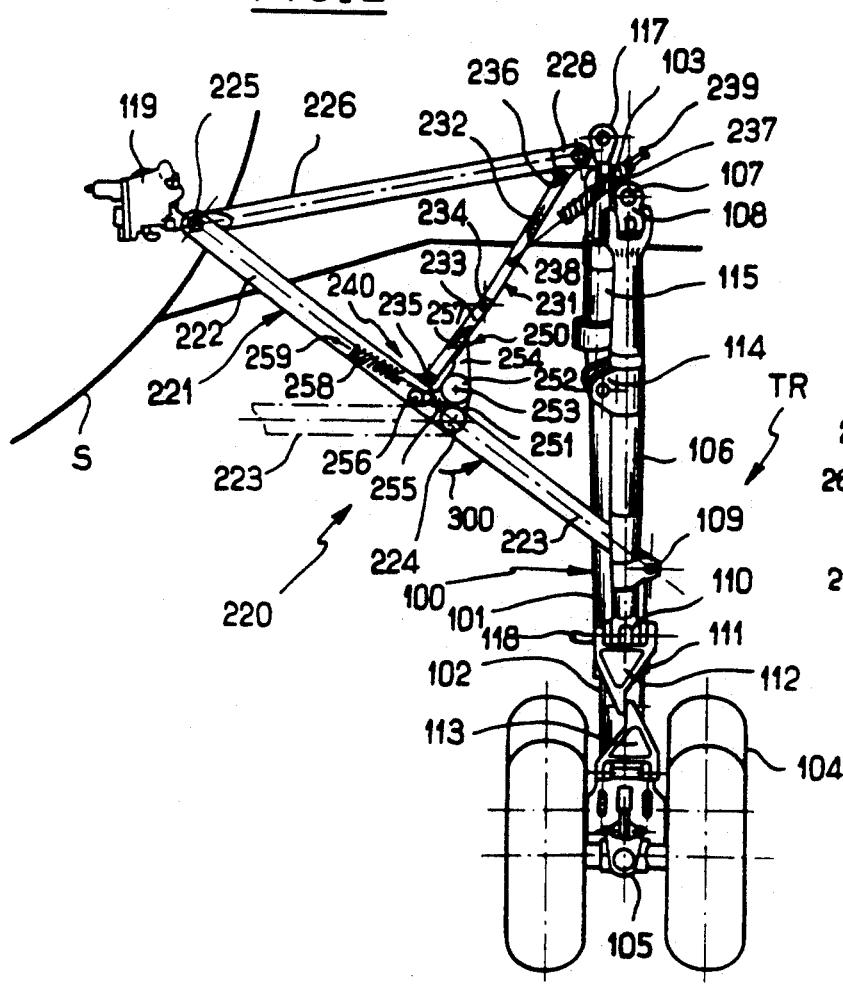
FIG. 2 shows a landing gear of the invention in the lowered position.

The landing gear TR shown in FIG. 2 has several components that are identical to those of the landing gear T shown in FIG. 1. These components are therefore designated by the same reference numerals, and they are not described further below.

The landing gear TR of the invention differs from the prior art landing gear TR essentially in the structure of its two-alignment side-brace, and in the structure of the unlocking means provided for breaking the secondary alignment of said side-brace which is hinged and consequently for breaking the main alignment of said side-brace when the landing gear is raised.

Like the above-described side-brace, the hinged side-brace 220 includes a main alignment 221 connecting the shock absorber strut 101 (via its above-mentioned hinge 109) to the airplane structure S (at a hinge 225 which is also associated with a connecting rod 226), and it comprises an upper arm 222 and a lower arm 223 that are hinged together at a hinge 224. The secondary alignment 231 connects one of the arms of the main alignment 221 (in this case the upper arm 222, via a hinge 235) to the airplane structure (at a hinge 236 associated with one end 228 of the above-mentioned fixed connecting rod 226), and it is likewise constituted by an upper arm 232 and a lower arm 233 which are hinged together about a hinge 234. As before, at least one traction spring 237 is provided connecting the upper arm 232 of the secondary alignment 231 (at 238) to the airplane structure (at 239) so as to exert return torque on the secondary alignment 231 in the deployment direction thereof.

It will be observed that the above-mentioned components of the side-brace 220 are given the same references, plus 100, as the corresponding components of the side-brace 120 of the landing gear T shown in FIG. 1.

Unlocking means 240 are also provided for breaking the secondary alignment 231, and consequently for breaking the main alignment 221, when the landing gear TR is raised.

In accordance with an essential aspect of the invention, the unlocking means 240 are essentially constituted by a lever 250 rotatably mounted on the arm of the main alignment 221 having the secondary alignment 231 hinged thereon (i.e. in the present case the upper arm 222), and by a motor and gear box assembly 252 which rotates said rotary lever. Fundamentally, the rotary lever 250 includes an unlocking arm 254 which, when the motor and gear box assembly 252 is actuated, co-operates with the lower arm 233 of the secondary alignment 231 to break said secondary alignment.

In this case, the rotary lever 250 is mounted between the hinge 235 connecting the upper arm 222 of the main alignment 221 with the lower arm 233 of the secondary alignment 231, and the hinge 224 between the two arms 222 and 223 of the main alignment 221. The rotary lever 250 thus acts as a pusher-lever via the free end 257 of its unlocking arm 254. The hinge axis referenced 253 of the rotary lever 250 is thus to be found between the axes of the above-mentioned hinges 235 and 224. In a variant, the rotary lever 250 could be disposed on the other side of the hinge 235, with the unlocking arm 254 then exerting traction on the arm 233 to break the secondary alignment 231. Nevertheless, the embodiment shown appears to be the more advantageous insofar as it avoids any coupling connection between the unlocking arm of the rotary lever and the lower arm of the secondary alignment. Under such circumstances it appears also to be essential to provide return means associated with the rotary lever 250 so as to ensure that it returns to its initial position when the landing gear is raised. A spring element could be provided connecting the unlocking arm 254 of the rotary lever 250 to one of the two arms of the main alignment. Nevertheless, it is advantageous to dispose the rotary lever 250 in such a manner as to ensure that it also presents a return arm 255 which co-operates with the return means associated with the rotary lever 250. In this case, the rotary lever 250 is in the form of a bell-crank, and has an unlocking arm 254 and a return arm 255 that are of substantially the same length. It is then easy to provide a traction spring 258 connecting the return arm 255 of the rotary lever 250 to a point 259 of the upper arm 222 of the main alignment 221.

The functional assembly associated with the rotary lever 250 is represented in this case by tabs 251 on the upper arm 222 of the main alignment 221, in the vicinity of the hinge 224 between the two arms of said main alignment. In practice, it would naturally be possible to provide for the corresponding end of the upper arm 222 to be implemented in the form of a fork between the two branches between which the return arm 255 of the rotary lever 250 can move freely, thereby making it possible to obtain a particularly compact structure for said functional assembly.

When the landing gear is to be raised, it then suffices to actuate the motor and gear box assembly 252 associated with the rotary lever 250 to cause the rotary lever to rotate in the direction given by arrow 300, thereby instantaneously obtaining action that serves to break the secondary alignment 231, and consequently to break the main alignment 221 of the hinged side-brace 220. When the landing gear is raised, the rotary lever 250 is returned to its initial position by the spring 258 in such a manner that such rotary lever never opposes subsequent deployment of the two-articulation side-brace, i.e. never opposes lowering of the landing gear.

It is nevertheless advantageous to provide additional safety guaranteeing that the rotary lever returns to its initial position when the landing gear is raised. Simple means illustrated herein consists in causing the lower arm 223 of the main alignment 221 to act in such a manner that said arm itself acts on the rotary lever 250 while the landing gear is being raised, in the event that the return spring 258 fails to perform its function properly (which could be the result of jamming or of breakage of the teeth used in the motor and gear box assembly associated with the rotary lever 250). To this end, provision is made for the return arm 255 of the rotary lever 250 to have an end wheel 256 which is disposed in such a manner that the lower arm 223 comes into contact with said end wheel while the landing gear is being raised, thereby ensuring that the rotary lever returns to its initial position when the landing gear is raised. The corresponding relative position of said lower arm 223 is represented by chain-dotted lines in FIG. 2 to show how the co-operation takes place. If the corresponding end of the upper arm 222 of the main alignment 221 is implemented in the form of a fork, as mentioned above, then the return arm 255 and the end wheel 256 associated therewith can be disposed level with the midplane of the main alignment such that the action of the lower arm 223 in providing additional safety means for ensuring return of the rotary lever 250 is made easier, in practice.

Figure 3:
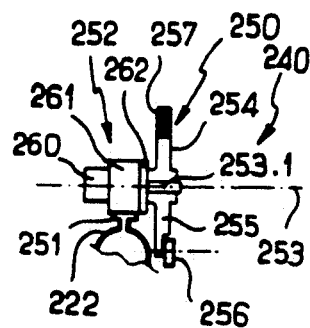
FIG. 3 is a fragmentary profile view showing the motor and gear box assembly associated with the rotary lever (it naturally being possible to divise other configurations, as explained below).

The fragmentary profile of FIG. 3 shows one possible disposition for the motor and gear box assembly 252 associated with the rotary lever 250. The motor and gear box assembly 252 thus includes a motor 260 which is preferably a brushless asynchronous electric motor having a stepdown gear box 261 of one or more stages provided downstream therefrom. It is also preferable for the motor and gear box assembly 252 to be fitted with a torque limiter 262 disposed between the gear box 261 of said assembly and the rotary lever 252 of the assembly, which lever is then constrained to rotate with the outlet shaft 253.1 associated with the torque limiter 262. It is then advantageous for the torque limiter 262 to be of the friction type and to be rated at a value that exceeds the force of the locking spring(s) 237 and 258 associated with the hinged side-brace 220. This torque limiter thus constitutes a passive system that is "transparent" in normal operation, and that intervenes only in the event of jamming taking place under the direct action of the lower arm of the main alignment. The presence of such a torque limiter thus makes it possible to be quite certain that the rotary lever cannot prevent normal deployment of the two-alignment hinged side-brace, i.e. cannot prevent the landing gear from being lowered.

Raisable landing gear is thus implemented whose structure makes providing the unlocking function for breaking the two alignments of the side-brace achievable both easily and reliably, thereby ensuring that the landing gear can be raised normally without any risk of opposition to subsequent lowering of said landing gear.

The invention is not limited to the embodiment described above, but on the contrary extends to any variant that uses equivalent means to reproduce the essential characteristics specified above.

I claim:

1. Raisable landing gear comprising a shock absorbing strut hinged to the structure of an airplane, having a sliding rod that carries a set of wheels, and a two-alignment hinged side-brace with a main alignment that connects the shock absorbing strut to the structure of the airplane and constituted by an upper arm and a lower arm that are hinged together, and a secondary alignment connecting one of the arms of the main alignment to said structure of the airplane, said secondary alignment likewise being constituted by an upper arm and a lower arm that are hinged together, unlocking means also being provided to break the secondary alignment and consequently to break the main alignment when the landing gear is raised, wherein the unlocking means is essentially constituted by a lever mounted to rotate on that arm of the main alignment on which the secondary alignment is hinged, and by a motor and gear box assembly driving said rotary lever in rotation, said lever including an unlocking arm that, on actuation of said motor and a gear box assembly, co-operates with the lower arm of the secondary alignment to break said secondary alignment, return means also being associated with said rotary alignment to ensure that it returns to its initial position when the landing gear is raised.

2. Landing gear according to claim 1, wherein the rotary lever is mounted on the upper arm of the main alignment between the hinge connecting said arm to the lower arm of the secondary alignment and the hinge interconnecting the two arms of the main alignment, and having a return arm which co-operates with the return means associated with said rotary lever.

3. Landing gear according to claim 2, wherein the return means associated with the rotary lever include a traction spring connecting the return arm of said lever to a point on the upper arm of the main alignment.

4. Landing gear according to claim 2, wherein the return arm of the rotary lever has an end wheel, and is disposed in such a manner that the lower arm of the main alignment comes into contact with said end wheel while the landing gear is being raised, thereby guaranteeing that said rotary lever is returned to its initial position when the landing gear is raised.

5. Landing gear according to claim 2, wherein the rotary lever is in the form of a bell-crank, having an unlocking arm and a return arm which are of substantially the same length.

6. Landing gear according to claim 1, wherein the motor and gear box assembly is provided with a torque limiter disposed between the gear box of said assembly and the rotary lever.

7. Landing gear according to claim 6, wherein the torque limiter is a friction torque limiter, and is rated to a value that exceeds the force of the locking springs associated with the hinged side-brace.

* * * * *